Nov. 22, 1949     A. N. JOHNSON     2,488,977
CURB-TYPE BRIDLE BIT
Filed Nov. 12, 1948

Andrew N. Johnson
INVENTOR.

Patented Nov. 22, 1949

2,488,977

UNITED STATES PATENT OFFICE 2,488,977

CURB-TYPE BRIDLE BIT

Andrew N. Johnson, Rushville, Nebr.

Application November 12, 1948, Serial No. 59,527

1 Claim. (Cl. 54—7)

The present invention relates to certain new and useful improvements in bridle bits and has reference in particular to a curb bit characterized by a rod forming a mouthpiece and having the usual central tongue controlling bend with plate-like cheek pieces at the ends of the rod terminating in eyes at opposite ends to accommodate a bridle and check reins.

The object of the invention is to be able to satisfactorily and appropriately support the bit in the horse's mouth so that the top and bottom check reins may be selectively pulled by the rider in a manner to bodily rock the bit, bearings being provided and held between the upper and lower sets of teeth of the horse and said bearings being gripped by the horse's teeth making it impossible for the horse to actually grab hold of the mouthpiece and also making the rocking and controlling possibilities of the bit, as an entity, aptly suitable.

More specifically, in carrying out the principles of the present invention I provide a pair of flanged sleeves which constitute adapters which are gripped between the horse's teeth in an obvious manner and which function as the aforementioned bearings providing wanted control over the bit.

In carrying out a preferred embodiment of the invention the end portions of the rod forming the curb-type mouthpiece are reduced to provide shoulders and the reduced ends connected to the cheek pieces and said reduced ends then constitute journals which are mounted for rocking or oscillation in the bearings.

Other objects and advantages will become more readily apparent from the following description and the accompanying illustrative drawings.

Figure 1:
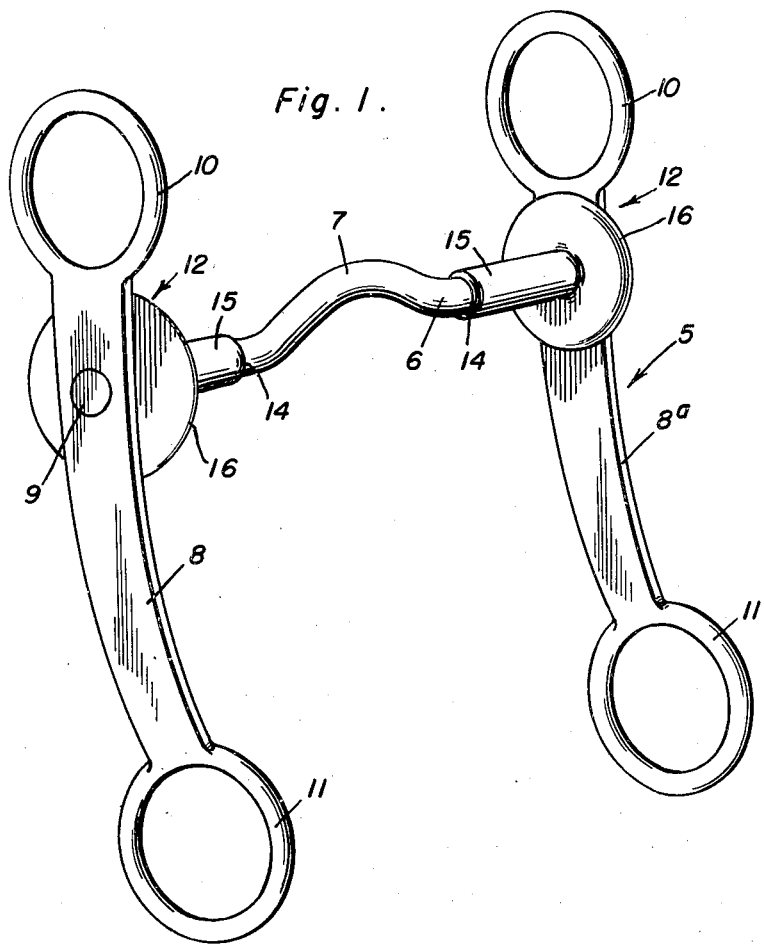
Figure 1 is a perspective view of a curb bit for bridles constructed in accordance with the principles of the present invention.
Figure 2:
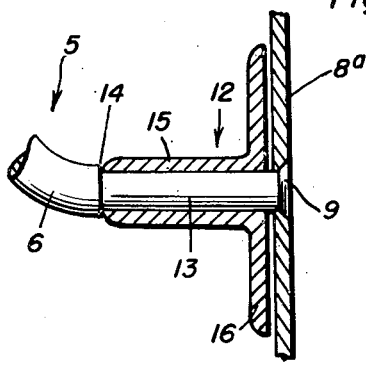
Figure 2 is a view in section and elevation showing the particular construction of the details.

Referring now to the drawings by distinguishing reference numerals it will be seen that the curb-type bridle bit, as a unitary device or structure, is denoted by the numeral 5 and is of usual construction, that is, it is characterized by a cross rod 6 of cylindrical cross sectional form for horizontal disposition in the horse's mouth, the same having a central curb bend 7 at its center. The right angularly disposed plates at the ends constitute cheek pieces or members and these are duplicates of one another and denoted by the numerals 8 and 8a. The cheek pieces are rigidly secured to the adjacent end portions 9 of the mouthpiece. The cheek pieces have eyes 10 at their upper ends and similar eyes 11 at their lower ends and said eyes serve to accommodate the usual bridle and check straps or reins (not shown). It will be understood that I do not claim to have invented a new curb bit. However, it is novel, as far as I know, to provide adapters 12 for properly mounting the entire bit in the horse's mouth. To accomplish this the end portions of the rod or mouthpiece are reduced in diameter, as at 13 in Figure 2, to provide what I call journals and also to define abutments or shoulders 14. Each adapter provides a bearing for the journal. Thus, the bit is journaled in bearings and the bearings are held by the horse's teeth. Each adapter comprises a sleeve 15 which forms the bearing proper and serves to accommodate the bearing, said sleeve being provided at its outer end with a disc-like shield or guard 16 which fits against the outer side of the horse's mouth preventing abrasive and abusive contact of the mouth with the freely rockable cheek members 8 and 8a.

In practice the adapters are gripped between the upper and lower sets of teeth in an obvious fashion thus making it impossible for the horse to bite directly on the rod or mouthpiece. When the teeth are held against the bearings or sleeves and with the guards 16 on the exterior of the mouth it will be seen that the bit as a unit is rockably mounted in the mouth of the animal. It thus becomes comparatively easy for the rider to utilize the check straps and reins in a manner to put the necessary controlling pressures where wanted for controlling a highly spirited horse.

It will be seen that I have evolved and produced a unique as well as safe and sane curb bit which is advantageous over similar types now commonly used. The assemblage, as a whole is characterized by simplicity, durability and practicability. Additively, all of the features contribute to the production of a superior curb bit.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

A curb-type bridle bit of the class shown and described comprising a rod forming a bit proper, said rod being bent intermediate its ends to provide a tongue curb, the end portions of said rod being reduced to provide shouldered journals, a pair of duplicate, parallel, plate-like cheek members rigidly secured intermediate their ends to the outer ends of said journals, said cheek members being provided at opposite ends with selectively usable eyes, and a pair of adapters adapted to be held between the respective upper and lower teeth of the animal, each adapter including a sleeve of a length slightly less than the coacting journal and an outstanding, integral, disc-like flange forming a protector guard, said sleeves constituting bearings and said journals being mounted for oscillation in said bearings.

ANDREW N. JOHNSON.

REFERENCES CITED

The following references are of record in the file of this patent:

UNITED STATES PATENTS

| Number | Name | Date |
|---|---|---|
| 1,140,971 | Falls | May 25, 1915 |
| 1,167,541 | Bars | Jan. 11, 1916 |

FOREIGN PATENTS

| Number | Country | Date |
|---|---|---|
| 5,835 | Great Britain | Mar. 16, 1908 |